United States Patent
Roy et al.

(10) Patent No.: US 11,424,916 B2
(45) Date of Patent: Aug. 23, 2022

(54) SELECTIVELY PRIVATE DISTRIBUTED COMPUTATION FOR BLOCKCHAIN

(71) Applicant: FUJITSU LIMITED, Kawasaki (JP)

(72) Inventors: Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 16/517,417

(22) Filed: Jul. 19, 2019

(65) Prior Publication Data

US 2021/0021408 A1   Jan. 21, 2021

(51) Int. Cl.
*H04L 9/08* (2006.01)
*H04L 9/30* (2006.01)
*H04L 9/06* (2006.01)
*G06F 16/182* (2019.01)

(52) U.S. Cl.
CPC .......... *H04L 9/085* (2013.01); *G06F 16/1824* (2019.01); *H04L 9/0618* (2013.01); *H04L 9/30* (2013.01); *H04L 2209/04* (2013.01); *H04L 2209/38* (2013.01); *H04L 2209/46* (2013.01)

(58) Field of Classification Search
None
See application file for complete search history.

(56) References Cited

U.S. PATENT DOCUMENTS

| | | | | |
|---|---|---|---|---|
| 10,127,378 | B2 * | 11/2018 | Toth | H04L 63/083 |
| 10,701,046 | B1 * | 6/2020 | Kaliski, Jr. | H04L 9/0836 |
| 10,797,860 | B1 * | 10/2020 | Dennis | H04L 63/205 |
| 11,159,313 | B2 * | 10/2021 | Fletcher | H04L 9/3073 |
| 2018/0322587 | A1 * | 11/2018 | Linne | H04L 9/3236 |
| 2019/0080321 | A1 * | 3/2019 | Mundis | G06Q 20/0855 |
| 2019/0123895 | A1 * | 4/2019 | Blake | H04L 63/062 |
| 2019/0340013 | A1 * | 11/2019 | Celia | G06F 9/5005 |
| 2019/0377889 | A1 * | 12/2019 | Mertens | H04L 9/0825 |
| 2019/0379646 | A1 | 12/2019 | Mandal et al. | |

(Continued)

OTHER PUBLICATIONS

Beimel et al.; Non-Interactive Secure Multiparty Computation; 2014; retrieved from the Internet https://link.springer.com/chapter/10.1007/978-3-662-44381-1_22; pp. 1-43, as printed. (Year: 2015).*

(Continued)

*Primary Examiner* — Michael W Chao
(74) *Attorney, Agent, or Firm* — Maschoff Brennan

(57) ABSTRACT

A method may include receiving, from a first trusted authority, a secret key specific to a party for use in posting to a blockchain. The method may also include receiving, from a second trusted authority, a correlated randomness component specific to the party and associated with a given temporal segment. The method may additionally include generating a party-generated randomized mask, and computing, using an input from the party, the correlated randomness component, and the party-generated randomized mask in a non-interactive multi-party computation (NIMPC), an NIMPC-encrypted input associated with the party for the given temporal segment. The method may also include encrypting the NIMPC-encrypted input according to a blockchain encryption algorithm to yield a ciphertext, and submitting the ciphertext to a block associated with the given temporal segment in a blockchain.

18 Claims, 8 Drawing Sheets

(56) References Cited

U.S. PATENT DOCUMENTS

| | | | | |
|---|---|---|---|---|
| 2019/0394175 A1* | 12/2019 | Zhang | ................. | H04L 9/085 |
| 2020/0134743 A1* | 4/2020 | Rentschler | ............ | G06Q 50/06 |
| 2020/0136815 A1* | 4/2020 | Trevethan | ................. | H04L 9/30 |
| 2021/0075616 A1* | 3/2021 | Mawdsley | .............. | H04L 63/10 |
| 2021/0091934 A1* | 3/2021 | Fletcher | ............... | H04L 9/3236 |

OTHER PUBLICATIONS

Liu et al.; How to build time-lock encryption; 2018; Retrieved from the Internet https://doi.org/10.1007/s10623-018-0461-x; pp. 1-38, as printed. (Year: 2018).*

Beimel, Amos, et al. "Non-interactive secure multiparty computation." International Cryptology Conference. Springer, Berlin, Heidelberg, Aug. 17-21, 2014.

Feige, Uri, Joe Killian, and Moni Naor. "A minimal model for secure computation." Proceedings of the twenty-sixth annual ACM symposium on Theory of computing. ACM, May 23-25, 1994.

Benhamouda, Fabrice, Hugo Krawczyk, and Tai Rabin. "Robust non-interactive multiparty computation against constant-size collusion." Annual International Cryptology Conference. Springer; Jun. 7, 2017.

Ishai, Yuval, and Eyal Kushilevitz. "Private simultaneous messages protocols with applications." Theory of Computing and Systems, 1997., Proceedings of the Fifth Israeli Symposium on. IEEE, Jun. 17-19, 1997.

Jager, Tibor. "How to Build Time-Lock Encryption." IACR Cryptology ePrint Archive May 19, 2015.

Boneh, Dan, Xavier Boyen, and Shai Halevi. "Chosen ciphertext secure public key threshold encryption without random oracles" Cryptographers' Track at the RSA Conference. Springer Berlin Heidelberg, Feb. 13, 2006.

Bellare, Mihir, and Viet Tung Hoang. "Adaptive witness encryption and asymmetric password-based cryptography." IACR International Workshop on Public Key Cryptography. Springer Berlin Heidelberg, Feb. 11, 2015.

Cheon, Jung Hee et al. "Provably secure timed-release public key encryption." ACM Transactions on Information and System Security (TISSEC) 11, No. 2; May 2008.

Unruh, Dominique. "Revocable quantum timed-release encryption." Journal of the ACM (JACM) vol. 62, No. 6, Article 49, Dec. 2015.

Boneh, Dan, and Moni Naor. "Timed commitments." Annual International Cryptology Conference. Springer Berlin Heidelberg, Aug. 20-24, 2000.

Brassard, Gilles, David Chaum, and Claude Crépeau. "Minimum disclosure proofs of knowledge." Journal of Computer and System Sciences 37.2 (Oct. 1988): 156-189.

Rivest, Ronald L., Adi Shamir, and David A. Wagner. "Time-lock puzzles and timed-release crypto." (Mar. 10, 1996).

Boneh, Dan, and Matt Franklin. "Identity-based encryption from the Weil pairing." Annual International Cryptology Conference. Springer Berlin Heidelberg, Aug. 2, 2001.

St. John, Jeff "Blockchain Energy Trading Startup Power Ledger Raises $17M in Cryptocurrency 'ICO'" Software & Analytics; Greentech Media; Sep. 6, 2017; greentechmedia.com.

Deign, Jason "Tepco backs Conjoule as the energy blockchain market begins to look a bit crowded." Oftware & Analytics; Greentech Media; Jul. 24, 2017; greentechmedia.com.

"Overview of Blockchain for Energy and Commodity Trading" 2017 Ernst & Young LLP.

* cited by examiner

SELECTIVELY PRIVATE DISTRIBUTED COMPUTATION FOR BLOCKCHAIN

FIELD

Embodiments of the present disclosure relate to distributed computation for blockchains that may be selectively private.

BACKGROUND

Blockchains operate as a distributed ledger, where each node in a network may store the entire database. Each node in a blockchain may contain a complete copy of the ledger. However, such an arrangement poses certain data privacy concerns for information submitted to such a blockchain.

SUMMARY

One or more embodiments of the present disclosure may include a method that includes receiving, from a first trusted authority, a secret key specific to a party for use in posting to a blockchain. The method may also include receiving, from a second trusted authority, a correlated randomness component specific to the party and associated with a given temporal segment. The method may additionally include generating a party-generated randomized mask, and computing, using an input from the party, the correlated randomness component, and the party-generated randomized mask in a non-interactive multi-party computation (NIMPC), an NIMPC-encrypted input associated with the party for the given temporal segment. The method may also include encrypting the NIMPC-encrypted input according to a blockchain encryption algorithm to yield a ciphertext, and submitting the ciphertext to a block associated with the given temporal segment in a blockchain.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

The present disclosure relates to the use of selectively private distributed computation for blockchain technology. In some circumstances, it may be desirable to only allow a party to observe the output of a computation based on their own input, rather than permitting the party to observe all the possible inputs. However, with blockchain technology, it is difficult to permit such computation to occur without exposing all of the inputs. The present disclosure provides embodiments via which a party may submit an input to a blockchain in an encrypted form such that others are unable to view or observe the input of the party. The correlated randomness components used by the parties are correlated such that the computation may be performed on the inputs without exposing their respective values. The party may derive their output from the distributed computation without observing others inputs and/or outputs because of the manner in which they are encrypted. Such implementations may provide particularly beneficial implementations in the context of energy markets, bidding marketplaces, etc. where a party may desire to observe their particular share in the market without being exposed to the distribution of the entire market.

Certain embodiments of the present disclosure may provide improvements over previous iterations of blockchain technology. For example, embodiments of the present disclosure may provide a more secure interaction between parties by permitting limited exposure of information. Additionally, the present disclosure may do so in a manner that provides only minimal computing overhead as much of the encryption is done at a local level and the encryption and masking algorithms may avoid extremely taxing encryption techniques because of the multiple layers of encryption and masking with differing parties generating the keys.

One or more example embodiments are explained with reference to the accompanying drawings.

Figure 1:
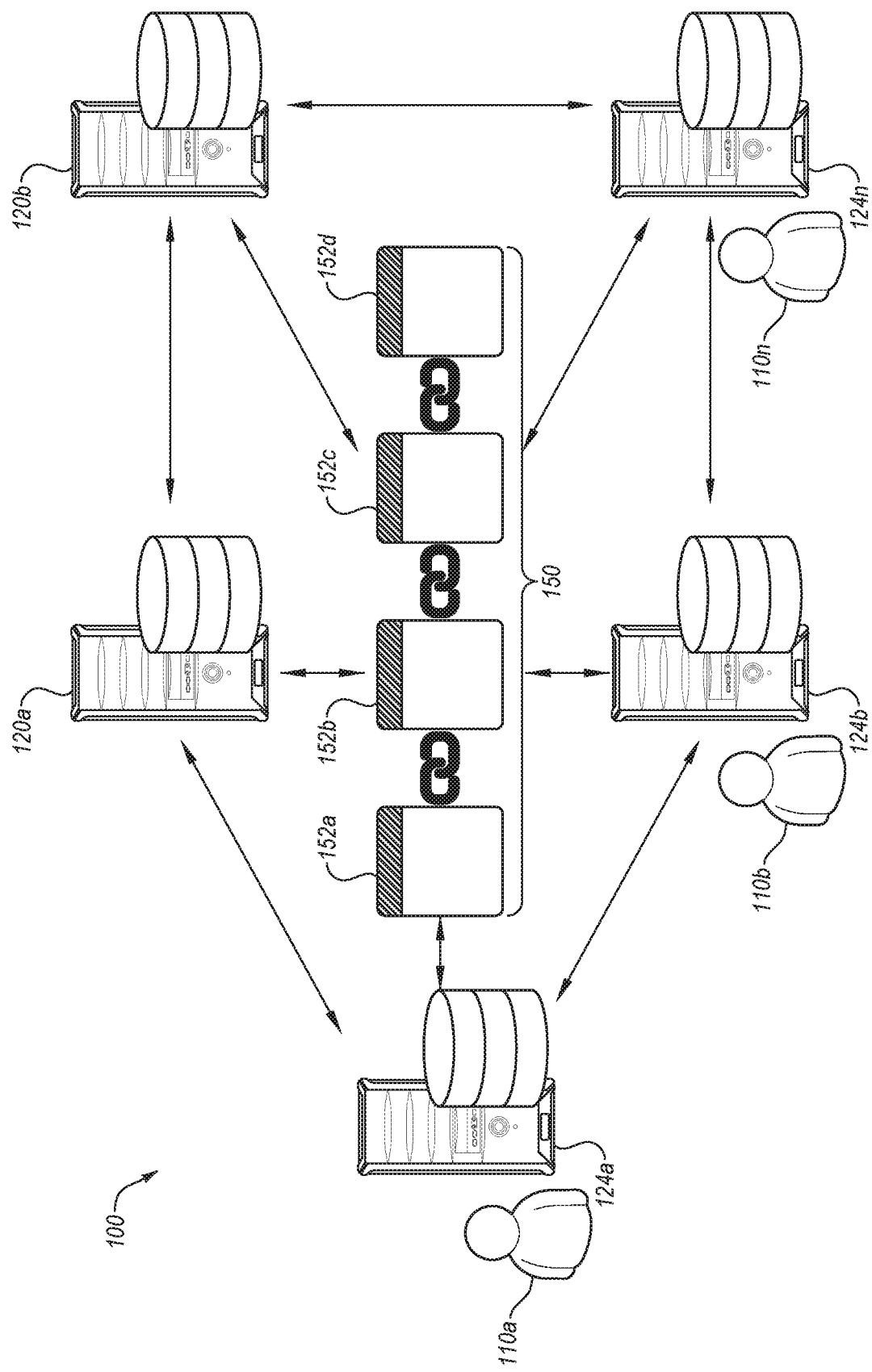
FIG. 1 is a diagram illustrating an example system that may be used for selectively private distributed computation in the context of a blockchain.

FIG. 1 is a diagram illustrating an example system 100 that may be used for selectively private distributed computation in the context of a blockchain 150, in accordance with one or more embodiments of the present disclosure. Parties 110 (such as the parties 110a, 110b, . . . , 110n) may interact with one or more trusted authorities 120 (such as the trusted authorities 120a and/or 120b) to facilitate an encryption process so the parties 110 may submit encrypted inputs to a block 152 of a blockchain 150. The inputs from the parties may be part of a non-interactive multiparty computation (NIMPC) that generates outputs for each of the parties 110. Using the encryption process, a particular party 110 may observe the output associated with the particular party 110, but may be limited in observing any other outputs. Because of the use of the blockchain 150 and the limited observation of results, such an approach provides a selectively private distributed computation in the context of the blockchain 150.

In some embodiments, a first initialization process may be undertaken before a party 110 is able to participate in submitting inputs to the blockchain 150. In these and other embodiments, a party 110 may interact with a first trusted authority 120*a* to receive a secret key for interacting with the blockchain 150. For example, the first trusted authority 120*a* may utilize the number (n) of parties 110 registering to interact with the blockchain 150, a threshold number (k) of key shares to be used to generate a blockchain decryption key, and a security parameter ($\Lambda$) to generate a set of keys. The set of keys may include a public key (PK), a verification key (VK), and a party-specific secret key ($SK_i$) for each of the $i^{th}$ party 110 of the n parties 110. After generation of the set of keys, the first trusted authority 120*a* may publish the public key and the verification key, and may securely provide the individual secret keys to each of the respective parties 110. An example of the first initialization process may be described with greater detail with reference to FIG. 4.

In some embodiments, a second trusted authority 120*b* may facilitate a second initialization process specific to a given temporal segment. For example, a "temporal segment" may include a period of time during which submissions from parties of bids, submission from parties of offers for sale, etc. are submitted. During the second initialization process, the second trusted authority 120*b* may generate a correlated randomness component (r) for each of the parties 110 participating in a given temporal segment. For example, using the number (n) of parties 110, the security parameter ($\Lambda$), and a function ($f$) related to the computation of the NIMPC, the second trusted authority 120*b* may generate the correlated randomness (r) for each of the parties 110. After generation of the correlated randomness, the second trusted authority 120*b* may securely provide the individual correlated randomness components (r) to each of the respective parties 110. In these and other embodiments, the correlated randomness (r) may be correlated such that values protected by the correlated randomness (r) may have certain functions or operations performed on the protected values without disclosing the underlying values. An example of the second initialization process may be described with greater detail with reference to FIG. 5.

In some embodiments, the first trusted authority 120*a* and the second trusted authority 120*b* may be the same entity, computing device, etc., such that the first and second initialization processes may be performed by the same actor and/or by the same device.

In some embodiments, a party 110 may submit an input (x) to the blockchain 150. For example, the party 110 may submit a bid for energy in an energy marketplace that is utilizing a selectively private distributed computation for blockchains consistent with the present disclosure. In these and other embodiments, the party may mask the input according to an NIMPC encryption protocol to yield an NIMPC-encrypted input (m) for the party, and the NIMPC-encrypted input (m) may be encrypted using an encryption process associated with the blockchain to yield a ciphertext (C) for posting to a given block 152 on the blockchain 150. The process of NIMPC-encrypting the input of the party 110 may include generating a random value (s) by the party and performing an encryption of the input of the party 110 based on the party input (x), the party-generated random value (s), and the correlated randomness (r) for the party, which may yield the NIMPC-encrypted input (m). The NIMPC-encrypted input (m) may be encrypted according to the blockchain encryption process using the public key (PK), a block identifier of the given block 152 of the blockchain 150, and the NIMPC-encrypted input (m) to yield the ciphertext (C). The ciphertext (C) may be posted to the given block 152 on the blockchain 150.

In some embodiments, a triggering event may close a temporal segment such that no additional inputs may be submitted to the given block 152 of the blockchain 150. In addition to a temporal segment, the triggering event may close a window for submitting information to the blockchain 150 based on other factors. For example, the triggering event may include a passage of time (e.g., the temporal segment may be configured to run for a fixed period of time, such as twelve minutes), a given event (e.g., the window may be open until a certain number of bids have been submitted, such as fifty bids, etc.), and/or any combinations thereof (e.g., after a certain amount of time and a minimum number of bids, the window may close).

In some embodiments, after and/or during the posting of the given block 152 to the blockchain 150, one or more parties 110 may generate private key shares (i, $\theta_i$) to post to the given block 152. The private key shares for an $i^{th}$ party may be generated based on the public key (PK) of the blockchain 150, an identifier of the party 110 (i), a secret key of the party 110 ($SK_i$), and/or the block identifier (bn) of the given block 152. In some embodiments, many of the parties 110 may operate to generate many private key shares (i, $\theta_i$) that may be posted to the given block 152. In these and other embodiments, the threshold number (k) may indicate a minimum number of key shares to be used in decrypting any of the values from the given block 152 of the blockchain 150. For example, if fewer than k key shares are submitted by parties 110 to the given block 152, the contents of the given block 152 may not be able to be decrypted until at least k key shares have been submitted to the given block 152. In some embodiments, the parties 110 submitting the key shares may or may not submit input values (e.g., the masked and/or encrypted input values x, as the ciphertext $C_i$) to the given block 152 of the blockchain 150. In these and other embodiments, such parties 110 may operate as moderators of the blockchain 150, such as permissioned parties 110 contributing to the consensus of the blockchain 150. In these and other embodiments, unless the consensus is failing, the given block 152 may include the k key shares. Additionally, if a given party 110 does not contribute to the consensus of the blockchain 150, the party may not participate in the generation and/or submission of the k key shares.

In some embodiments, an $i^{th}$ party 110 may derive the output ($g_i$) specific to them derived from the selectively private distributed computation. In these and other embodiments, the party 110 may determine whether a given block 152 (e.g., the block bn) has been added to the blockchain 150. The party 110 may collect at least a threshold number (k) of the key shares (i, $\theta_i$) submitted to the given block 152. The party 110 may verify the integrity of the key shares based on the public key (PK), the verify key (VK), the block identifier (bn), and/or the key shares (i, $\theta_i$). By verifying the integrity of the key shares, the party 110 may preempt certain attacks based on the submission of faulty or malicious key shares. Using the set of key shares (i, $\theta_i$), a blockchain decryption key ($d_{bn}$) may be derived that may be used to decrypt the given block 152 of the blockchain 150. Decrypting the given block 152 may yield the NIMPC-encrypted inputs (m) for each of the parties 110 that were submitted to the given block 152 in the blockchain 150. The party may derive a vector of output values masked by party-generated randomized masks ($f(x_1, s_1), \ldots, (x_n, s_n)$) using an NIMPC decryption process. The NIMPC decryption process may facilitate and/or perform the designated computation to be performed on the input values (x) in deriving the vector of output values. For the $i^{th}$ party 110, the party 110 may utilize their randomized mask ($s_i$) to unmask the masked version of the output ($f(x_i, s_i)$) to yield the output value ($g_i$) for the party 110 from the selectively private distributed computation. An example of the derivation of the output value ($g_i$) of the party 110 may be described with greater detail in reference to FIG. 6.

In some embodiments, the output value ($g_i$) for the party 110 may be used in a further operation, depending on the implementation and context in which the selectively private distributed computation for blockchains is used. For example, in the context of an energy market, the output value may be used to exchange energy and/or payment between two parties as identified by the output value ($g_i$) for the party 110 and/or the output function ($f(x)$) of some other party.

In some embodiments, the parties 110 may interact with the various computing systems and/or the blockchain 150 via the computing devices 124 (such as the computing device 124a, 124b, . . . , 124n). For example, while reference may be made to a party 110 performing a given task, the party 110 may interact with an associated computing device 124 to perform the articulated task.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described.

Figure 2:
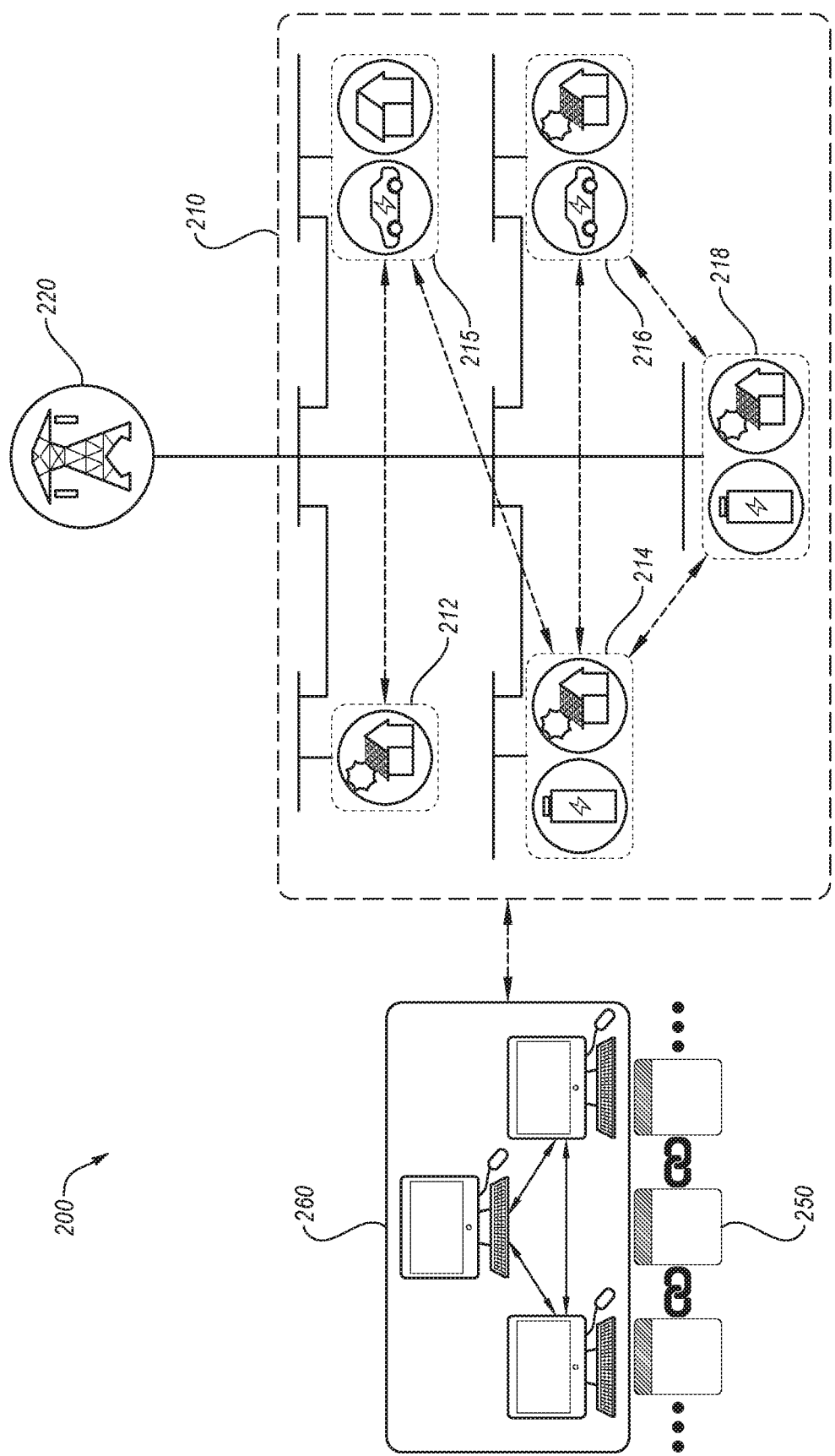
FIG. 2 illustrates an example energy providing system with an associated market utilizing selectively private distributed computation for blockchains.

FIG. 2 illustrates an example energy providing system 200 with an associated market utilizing selectively private distributed computation for blockchains 250, in accordance with one or more embodiments of the present disclosure. As illustrated in FIG. 2, the system 200 may include a microgrid 210 and a primary grid 220. Within the microgrid 210 are various consumers (e.g., parties who utilize energy but do not produce energy) and/or prosumers (e.g., parties that both produce and consume energy), including the prosumer 212, the prosumer 214, the consumer 215, the prosumer 216, and the prosumer 218. The microgrid 210 and/or the consumers and prosumers of the microgrid 210 may utilize the computing network 260 to interact with and/or manage a blockchain 250 related to the microgrid 210. The system 200 may include the main grid 220, which may be an actor in the market to provide offers to buy and/or sell energy in addition to the offers by the consumers and/or prosumers.

In some embodiments, prosumers such as the prosumers 212, 214, and/or 218 may generate more energy than they will use, so the prosumers 212, 214, and/or 218 may submit offers to a given block in the blockchain 250 of excess energy that they are willing to trade. The consumer 215 and/or the prosumer 216 who may use more energy than they are currently generating may submit offers to the block in the blockchain 250 to buy energy listed on the marketplace. In these and other embodiments, the blockchain 250 may facilitate the selectively private distributed computation of shares of energy to be bought and/or sold and the associated prices in a manner such that after a terminating event for a temporal segment of energy trading, a given party is only able to observe the output associated with their input (e.g., the amount of energy the person will receive at the rate they were willing to pay, and from where they will receive the energy).

Modifications, additions, or omissions may be made to the system 200 without departing from the scope of the disclosure. For example, the designations of different elements in the manner described is meant to help explain concepts described herein and is not limiting. Further, the system 200 may include any number of other elements or may be implemented within other systems or contexts than those described. For example, the system 200 may include any number of prosumers and/or consumers.

Figure 3:
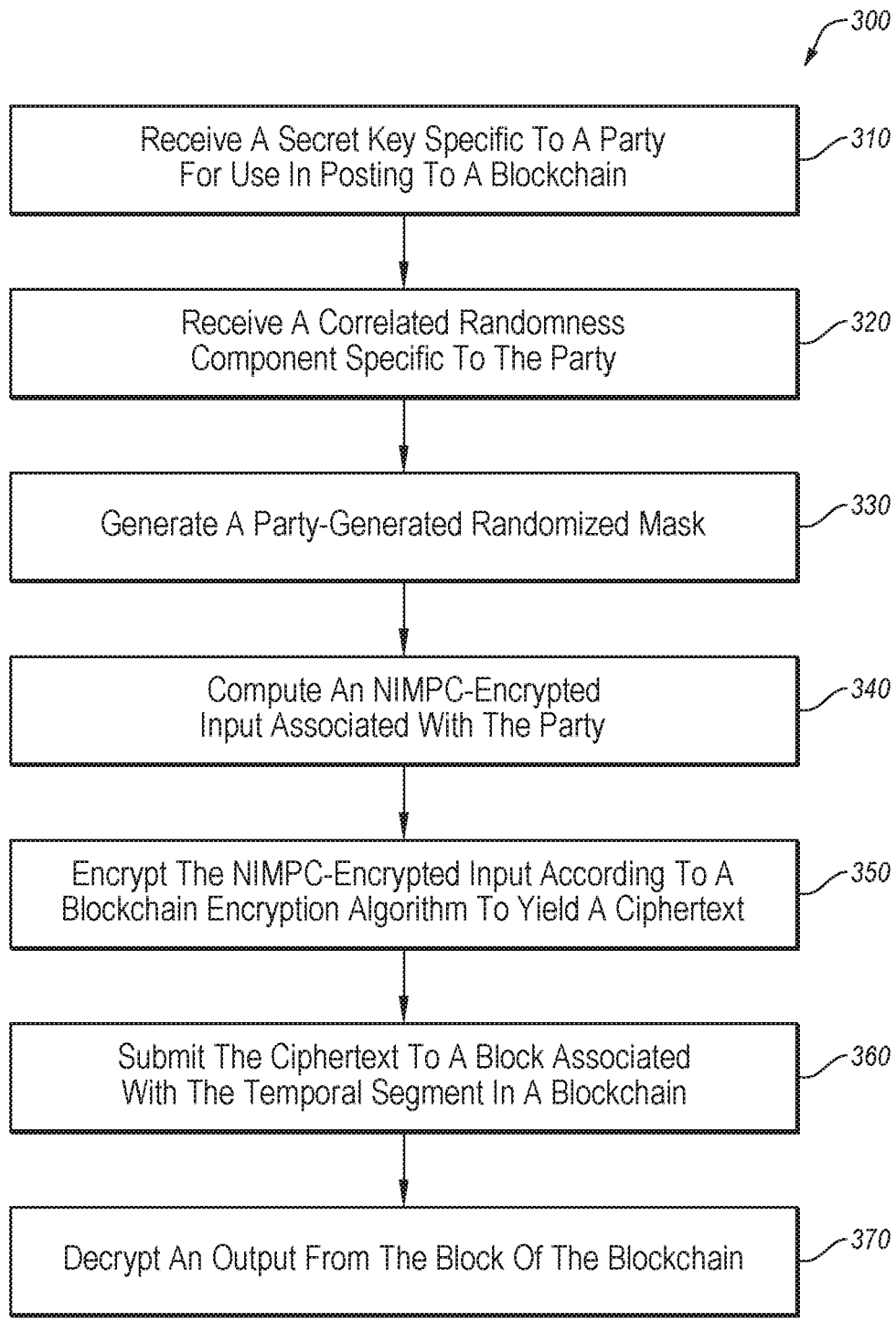
FIG. 3 illustrates an example flowchart of an example method of performing selectively private distributed computation in the context of a blockchain.

FIG. 3 illustrates an example flowchart of an example method 300 of performing selectively private distributed computation in the context of a blockchain, in accordance with one or more embodiments of the present disclosure. One or more operations of the method 300 may be performed by a system or device, or combinations thereof, such as the system 100, the parties 110, and/or the trusted authorities 120 of FIG. 1 and/or the system 200, the microgrid 210, and/or the computing network 260. Although illustrated as discrete blocks, various blocks of the method 300 may be divided into additional blocks, combined into fewer blocks, or eliminated, depending on the desired implementation.

At block 310, a party may receive a secret key specific to that party for use in posting to a blockchain. For example, a party (such as the party 110 of FIG. 1) may request such a secret key from a trusted authority (such as the trusted authority 120 of FIG. 1) so that the party may interact with the blockchain. The trusted authority may generate the secret key (for example, as described with reference to FIG. 4), and after generation of the secret key by the trusted authority, the secret key of the party may be securely provide to the party by the trusted authority.

At block 320, a correlated randomness component (r) that is specific to the party may be received by the party from a trusted authority. For example, the party may request correlated randomness for a specific temporal segment such that the party may participate in that temporal segment. The trusted authority may generate the correlated randomness (for example, as described with reference to FIG. 5), and after generation of the correlated randomness by the trusted authority, the correlated randomness may be securely provided to the party. The trusted authority may be the same trusted authority as in the block 310 or a different trusted authority.

At block 330, a party-generated randomized mask may be generated by the party. For example, the party may randomly select a numerical value, an integer, etc. to be used as the party-generated randomized mask (s) in submitting data to the blockchain.

At block 340, an NIMPC-encrypted input associated with the party may be computed. For example, the party may utilize various values to encrypt the input of the party (x) such that the input is still usable in the NIMPC computation but is masked from observation by others. In these and other embodiments, the party may use the input (x), the party-generated randomness mask (s), and the correlated randomness mask (r) to generate the NIMPC-encrypted input (m). For example, stated mathematically, the party may perform an operation:

$$\text{NIMPC}.Enc_i((x_i,s_i),r_i) \to m_i$$

where NIMPC.Enc may include a function that generates the NIMPC-encrypted input (m) for the $i^{th}$ party in a manner that the encrypted input (m) may still be used in computations due to the correlated randomness of the value of (m).

At block 350, the NIMPC-encrypted input may be encrypted according to a blockchain encryption algorithm to yield a ciphertext. For example, the party may utilize the public key (PK), and the block identifier of the block for the temporal segment (bn) to encrypt the NIMPC-encrypted input (m), yielding the ciphertext ($C_i$). For example, stated mathematically, the party may perform an operation:

$$TIBE.Encrypt(PK_i, bn, m_i) \rightarrow C_i$$

where TIBE.Encrypt may include a function that performs a threshold identity based encryption (TIBE), although any encryption process consistent with blockchain may be used. In some embodiments, when encrypting NIMPC-encrypted input, the party may identify a block to be posted at some point in the future as the block to which the input may be tied for decryption. For example, the party may post to a first block and designate a second block in the future as being tied to decrypting the content posted to the first block. In these and other embodiments, such a configuration may provide an additional level of security as the first block may not be decrypted until the point of time in the future is reached such that the first block is made available for decryption.

At block 360, the ciphertext may be submitted by the party to a block associated with the temporal segment in a blockchain. For example, the party may submit the ciphertext and block identifier ($C_i$, bn) to the blockchain identified above at block 350. In these and other embodiments, the submission of the block may include posting the ciphertext and block identifier ($C_i$, bn) to the blockchain.

At block 370, an output from the block of the blockchain may be decrypted. For example, the party may obtain the output of the NIMPC computation $f((x_1, s_1), \ldots, (x_n, s_n))$ and the $i^{th}$ party may identify ($f_i$) and extract the output ($g_i$) using the party-generated randomized mask ($s_i$). An example explanation of the block 370 may be provided in greater detail with reference to FIG. 6.

Modifications, additions, or omissions may be made to the method 300 without departing from the scope of the disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4:
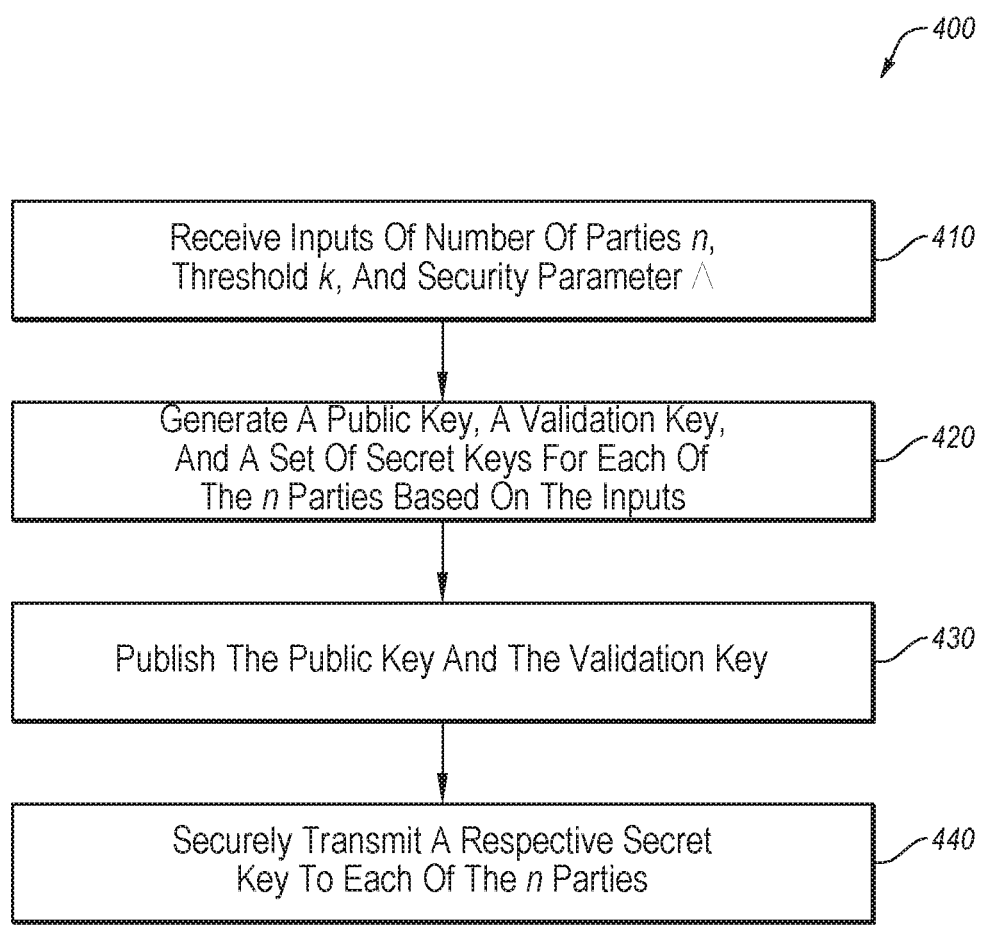
FIG. 4 illustrates an example flowchart of an example initialization method associated with performing selectively private distributed computation in the context of a blockchain.

FIG. 4 illustrates an example flowchart of an example initialization method 400 associated with performing selectively private distributed computation in the context of a blockchain, in accordance with one or more embodiments of the present disclosure. For example, the initialization method 400 may be performed to provide parties with the encryption keys used in encrypting and/or decrypting information associated with a given blockchain. One or more operations of the method 400 may be performed by a system or device, or combinations thereof, such as the system 100, the parties 110, and/or the trusted authorities 120 of FIG. 1 and/or the system 200, the microgrid 210, and/or the computing network 260. Although illustrated as discrete blocks, various blocks of the method 400 may be divided into additional blocks, combined into fewer blocks, or eliminated, depending on the desired implementation.

At block 410, a trusted authority may receive as inputs a number of parties (n), a threshold number (k), and a security parameter ($\Lambda$). The number of parties may be based on a number of parties that register to participate in a given type of blockchain, market, etc., a pre-defined number of potential participants, or any other metric. In these and other embodiments, the threshold number (k) may be selected based on the desired security of the blockchain and/or the desired efficiency of adding new blocks to the blockchain. For example, a higher value of the threshold number (k) may provide a more secure blockchain with greater redundancy required for blocks (e.g., more parties may be required to recognize a given block) while a lower value may permit a more agile blockchain with more quickly approved blocks. The security parameter ($\Lambda$) may be a value selected by the trusted authority to facilitate generation of the set of keys and may be used in generating the correlated randomness. In these and other embodiments, the security parameter ($\Lambda$) may be used to select a desired level of security.

At block 420, a public key, a validation key, and a set of secret keys for each of the n parties may be generated based on the inputs of the block 410. The trusted authority may generate keys that include a public key (PK), a verification key (VK), and a party-specific secret key ($SK_i$) for each of the $i^{th}$ party. For example, stated mathematically, the trusted authority may perform an operation:

$$Setup(n, k, \Lambda) \rightarrow (PK, VK, SK_1, \ldots, SK_n)$$

where Setup may include a key-generating function that generates the keys identified above.

At block 430, the public key and the validation key may be published. For example, the trusted authority may transmit the public key and the validation key to a certain group of individuals, such as the parties who registered to participate. As another example, the trusted authority may post the public key and the validation key to a website, message board, or some other publicly accessible location for observation and/or retrieval.

At block 440, the trusted authority may securely transmit the respective secret key to each of the n parties. The secure transmission may take any form, such as a secure session between the trusted authority and the party, encrypted communication between the trusted authority and the party, etc.

Modifications, additions, or omissions may be made to the method 400 without departing from the scope of the disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
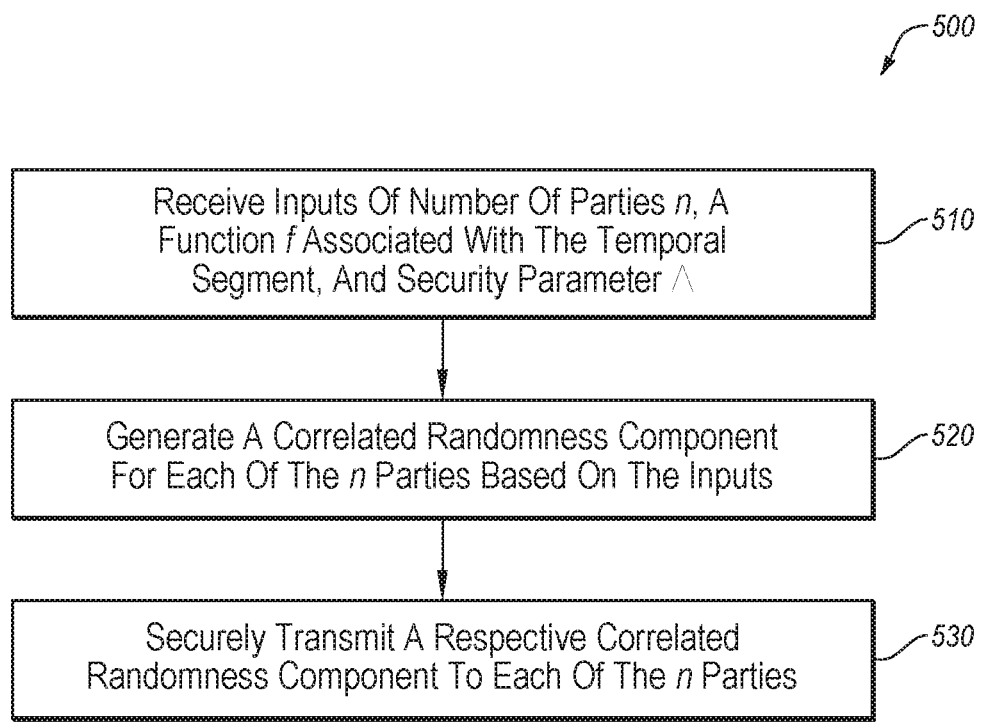
FIG. 5 illustrates another example flowchart of another example initialization method associated with performing selectively private distributed computation in the context of a blockchain.

FIG. 5 illustrates another example flowchart of another example initialization method 500 associated with performing selectively private distributed computation in the context of a blockchain, in accordance with one or more embodiments of the present disclosure. For example, the initialization method 500 may be performed to provide parties with party-specific and temporal segment-specific encryption values to protect the inputs provided to the blockchain. One or more operations of the method 500 may be performed by a system or device, or combinations thereof, such as the system 100, the parties 110, and/or the trusted authorities 120 of FIG. 1 and/or the system 200, the microgrid 210, and/or the computing network 260. Although illustrated as discrete blocks, various blocks of the method 500 may be divided into additional blocks, combined into fewer blocks, or eliminated, depending on the desired implementation.

At block 510, a trusted authority may receive as inputs a number of parties (n), a function ($f$) associated with a temporal segment, and a security parameter ($\Lambda$). The number of parties (n) may be the same (n) as used with reference to FIG. 4. Additionally or alternatively, the number of parties (n) may represent the number of parties registered or requesting to participate in the respective temporal segment. For example, in the context of an energy market, the number (n) as used with reference to FIG. 4 may represent all parties who have registered to participate in the energy market, and the number (n) as used in FIG. 5 may represent the parties who have registered or requested to participate in the particular window of energy up for trading. The function (f) may represent the NIMPC computation to be performed on the inputs of the parties. The security parameter ($\Lambda$) may be the same as that used above. In some embodiments, the inputs may be provided by an operator of the blockchain, an administrator of a market using the blockchain, etc. Additionally or alternatively, the inputs may be derived by the trusted authority itself (e.g., by tracking the number of parties registered to participate in the given temporal segment, etc.).

At block 520, part-specific correlated randomness may be generated for each of the n parties based on the inputs received at the block 510. For example, the trusted authority may generate correlated randomness components ($r_i$) for each of the n parties. Stated mathematically, the trusted authority may perform an operation:

$$\text{NIMPC.Setup}(f,n,\Lambda) \rightarrow (r_1, \ldots, r_n)$$

where NIMPC.Setup may include a function that generates the correlated randomness (r). In these and other embodiments, the correlated randomness may permit the function (f) to operate on inputs protected by the correlated randomness without exposing the value of the inputs.

At block 530, the correlated randomness components may be securely transmitted to each of the respective n parties by the trusted authority. For example, the trusted authority may establish a secure session between the trusted authority and the party to provide the correlated randomness (r), may encrypt a communication between the trusted authority and the party including the correlated randomness (r), etc.

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
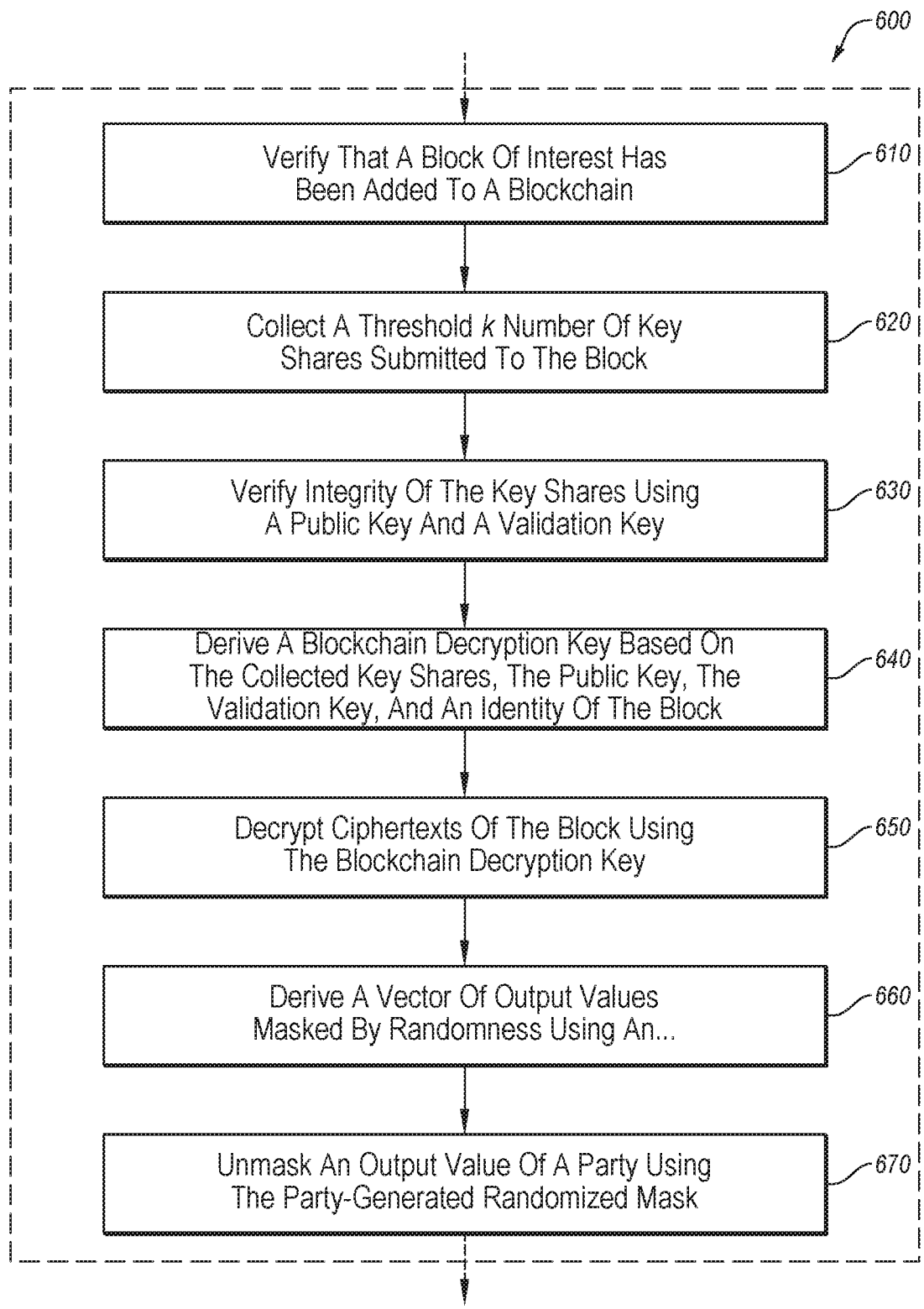
FIG. 6 illustrates an example flowchart of an example method associated with decrypting a message from a blockchain.

FIG. 6 illustrates an example flowchart of an example method 600 associated with decrypting a message from a blockchain, in accordance with one or more embodiments of the present disclosure. In some embodiments, the method 600 may represent an example implementation of the block 370 of FIG. 3, and as such may represent an intermediate operation in another process, although the method 600 may stand on its own. One or more operations of the method 600 may be performed by a system or device, or combinations thereof, such as the system 100, the parties 110, and/or the trusted authorities 120 of FIG. 1 and/or the system 200, the microgrid 210, and/or the computing network 260. Although illustrated as discrete blocks, various blocks of the method 600 may be divided into additional blocks, combined into fewer blocks, or eliminated, depending on the desired implementation.

At block 610, verification that a block of interest has been added to a blockchain may be performed. For example, a party may electronically observe the blockchain to confirm the presence of the block. In these and other embodiments, the block may be added to the blockchain based on the passage of time (e.g., the window for submitting bids to a market has closed), a triggering event (e.g., a certain number of offers have been posted, a certain number of parties has approved a proposed block, etc.), etc.

At block 620, a threshold number of key shares submitted to the block of interest may be collected. For example, the party may collect at least the threshold number (k) of key shares (i, $\theta_i$) from the block, where the key shares (i, $\theta_i$) may be submitted to the block by parties permissioned to be moderators, administrators, or otherwise facilitate the addition of blocks to the blockchain.

At block 630, the integrity of the key shares may be verified using a public key and a validation key associated with the blockchain. For example, the party may obtain the public key (PK) and the validation key (VK) (such as those generated at the block 420 in FIG. 4) from a published location of the public and validation keys. Stated mathematically, the party 110 may perform an operation:

$$\text{ShareVerify}(PK, VK, bn, (i, \theta_i))$$

where (bn) may represent an identifier of the block of interest and Share Verify may represent a function that outputs a binary result of either valid or invalid for the key shares for the identified block.

At block 640, a blockchain decryption key may be derived based on the collected key shares, the public key, the validation key, and the identifier of the block of interest. Such a blockchain decryption key may be specific to a specifically identified block. For example, stated mathematically, the party may perform the operation:

$$\text{Combine}(PK, VK, bn, S)$$

where (S) may represent the collected set of key shares, and Combine may represent a function that outputs the blockchain decryption key ($d_{bn}$) for decrypting the block of interest (bn) from the block chain decryption algorithm.

At block 650, the ciphertexts of the block of interest may be decrypted using the blockchain decryption key derived at the block 640. For example, the ciphertexts for each of the parties may be decrypted such that the party may obtain $m_1, \ldots, m_n$ using the blockchain decryption key ($d_{bn}$).

At block 660, a vector of output values masked by randomness may be derived using an NIMPC decryption process. For example, the party may perform the NIMPC decryption process on the protected values (m) for each of the parties to generate the vector output $f((x_i, s_i), \ldots, (x_n, s_n))$. Stated mathematically, the party may perform the operation:

$$\text{NIMPC.Dec}(m_1, \ldots, m_n) \rightarrow f((x_1, s_1), \ldots, (x_n, s_n))$$

where ($x_i$, $s_i$) may represent the combination of the input (x) of the $i^{th}$ party and the party-generated randomness mask (s), f( ) may represent the output function of the distributed computation, and NIMPC.Dec may represent the NIMPC decryption process that may yield the output function of distributed computation. In some embodiments, the NIMPC.Dec function may be configured to perform the distributed computation where the outputs of the computation are still masked by at least one level of randomness.

At block 670, the party may unmask an output value of the party using the party-generated randomized mask. For example, the $i^{th}$ party may perform computation on the $i^{th}$ element of the vector output of the NIMPC.Dec operation of the block 660. For example, the party may use the party-generated randomized mask ($s_i$) to unmask the ultimate output from the selectively distributed computation. Stated mathematically, the party may perform the operation:

$$g_i = f((x_i, s_i)) \oplus s_i$$

where ($g_i$) may represent the output of the selectively distributed computation for the $i^{th}$ party. Because the party uses the party-generated randomized mask ($s_i$) to unmask the output, the party may be prevented from seeing outputs of other parties.

Modifications, additions, or omissions may be made to the method 600 without departing from the scope of the disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
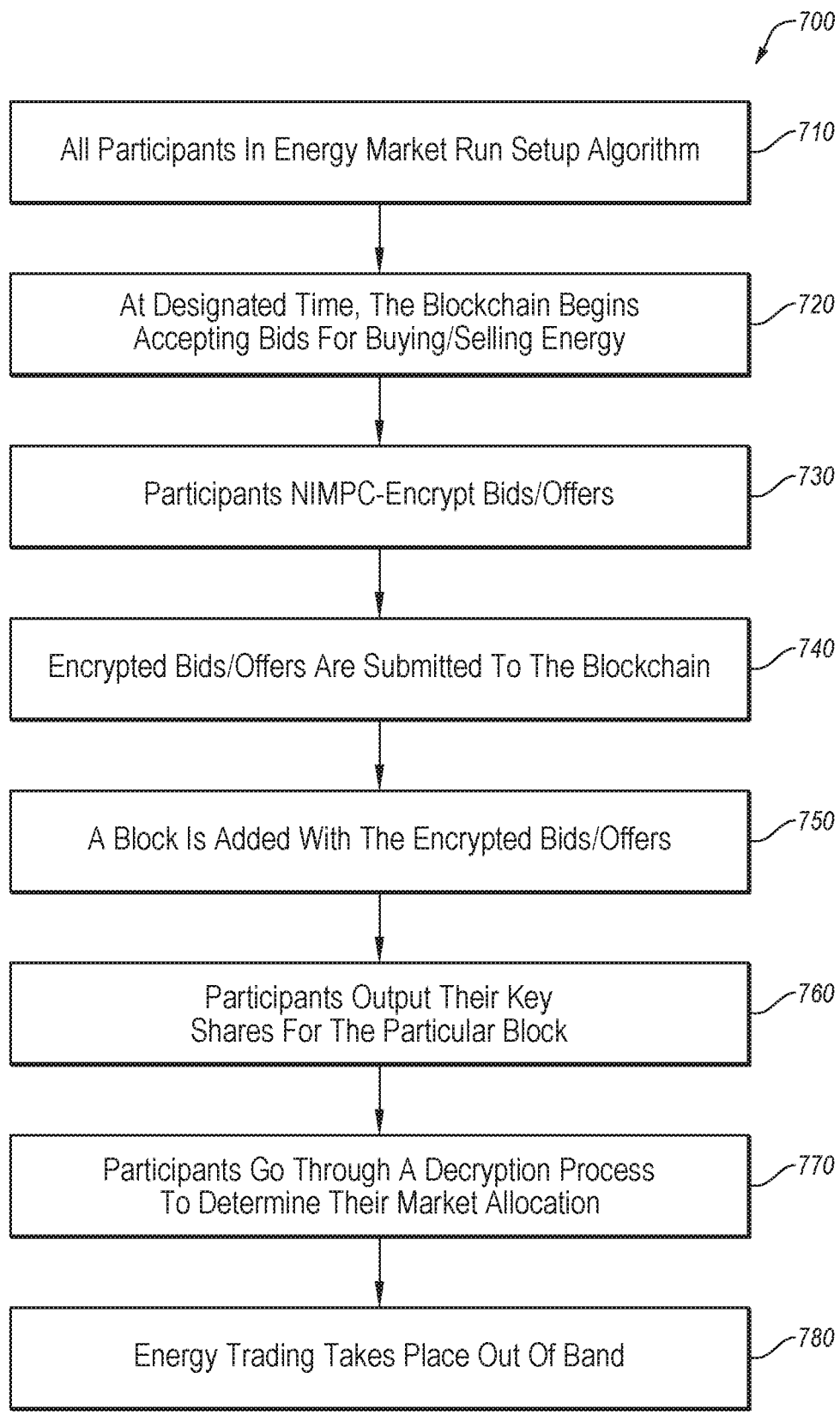
FIG. 7 illustrates an example flowchart of an example method of utilizing selectively private distributed computation in the context of a blockchain to facilitate transactions in an energy market.

FIG. 7 illustrates an example flowchart of an example method 700 of utilizing selectively private distributed computation in the context of a blockchain to facilitate transactions in an energy market, in accordance with one or more embodiments of the present disclosure. One or more operations of the method 700 may be performed by a system or device, or combinations thereof, such as the system 100, the parties 110, and/or the trusted authorities 120 of FIG. 1 and/or the system 200, the microgrid 210, and/or the computing network 260. Although illustrated as discrete blocks, various blocks of the method 700 may be divided into additional blocks, combined into fewer blocks, or eliminated, depending on the desired implementation.

At block 710, all participants in the energy market may run a setup algorithm. In these and other embodiments, the setup algorithm may include an initialization process by which the participants may obtain a secret key for interacting with a blockchain associated with the energy market and/or correlated randomness for a given temporal segment associated with the blockchain for the energy market.

At block 720, at a designated time, the blockchain may begin accepting bids for buying and/or selling energy. For example, the designated time may represent a periodic window of time for which energy is traded, and after that window has closed, another window of energy trading begins and the designated time may represent the beginning of such a window. The window of time may represent a temporal segment associated with a given block of the blockchain.

At block 730, participants in the temporal segment may NIMPC-encrypt their respective bids and/or offers. For example, a participant may utilize the secret key and/or correlated randomness to mask and/or encrypt an input value of an offer to buy and/or sell energy during the temporal segment.

At block 740, the encrypted bids and/or offers may be submitted to the blockchain. For example, a participant may provide their block to a party with permission to add blocks to the blockchain, and/or may send the proposed block to other parties for approval.

At block 750, a block is added with the encrypted bids and/or offers to the blockchain. In these and other embodiments, the block may be representative of the bids and/or offers received for the given temporal segment.

At block 760, participants may output their key shares for the particular block. For example, a threshold number of participants may submit key shares such that the block may be decrypted based on the decryption algorithm for the blockchain.

At block 770, participants may go through a decryption process to determine their market allocation of the energy. For example, the decryption process may decrypt the blockchain information and may unmask the output of the party such that the party may identify how much energy they obtained and at what rate, how much energy they are to provide and at what rate, where the party should obtain and/or send the energy, etc. In these and other embodiments, the function $f(\ )$ may be selected such that certain pieces of information may be obtained from the function about each of the parties, depending on the implementation. For example, the function $f(\ )$ may expose an identity of a party, an address of a party, etc.

At block 780, energy trading may take place out of band based on the market allocation obtained at the block 770. For example, a given bidding party and the matched up offering party may exchange payment for energy outside of the context of the blockchain.

Modifications, additions, or omissions may be made to the method 700 without departing from the scope of the disclosure. For example, the operations of the method 700 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 8:
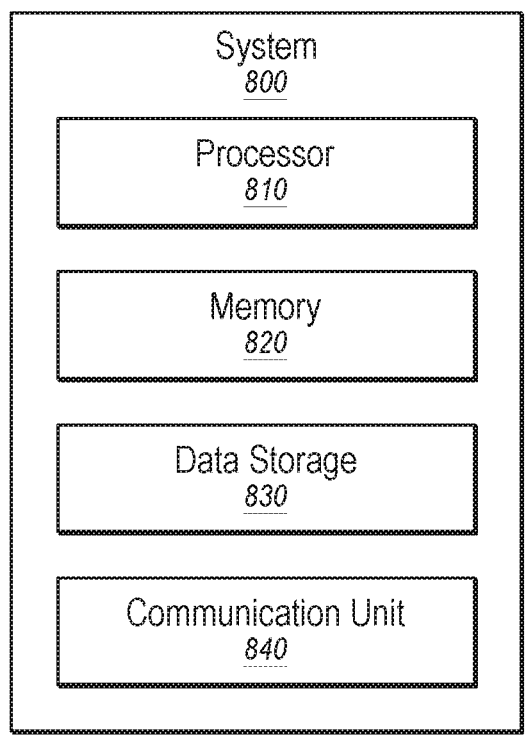
FIG. 8 illustrates an example computing system.

FIG. 8 illustrates an example computing system 800, according to at least one embodiment described in the present disclosure. The computing system 800 may include a processor 810, a memory 820, a data storage 830, and/or a communication unit 840, which all may be communicatively coupled. Any or all of the system 100 of FIG. 1 may be implemented as a computing system consistent with the computing system 800, including the party computing devices 124, and/or the trusted authorities 120.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform any of the methods 300, 400, 500, 600, and/or 700 of FIGS. 3-7, respectively. For example, the processor 810 may obtain instructions regarding encrypting an input for a blockchain, performing selectively private distributed computations, and/or decrypting a message from the blockchain.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. For example, the memory 820 and/or the data storage 830 may store a complete copy of a blockchain (such as the blockchain 150 of FIG. 1). In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

One skill in the art, after reviewing this disclosure, may recognize that modifications, additions, or omissions may be made to the system 800 without departing from the scope of the present disclosure. For example, the system 800 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   receiving, from a first trusted authority, a secret key specific to a party for use in posting to a blockchain;
   receiving, from a second trusted authority, a correlated randomness component specific to the party and associated with a given temporal segment;
   generating a party-generated randomized mask;
   computing, by an electronic device of the party, using an input from the party, the correlated randomness component, and the party-generated randomized mask in a non-interactive multi-party computation (NIMPC), an NIMPC-encrypted input associated with the party for the given temporal segment;
   encrypting, by the electronic device of the party, the NIMPC-encrypted input according to a blockchain encryption algorithm to yield a ciphertext;
   submitting the ciphertext to a block associated with the given temporal segment in a blockchain; and
   decrypting an output from the block of the blockchain associated with the given temporal segment, including unmasking an output value of the party from a vector of output values based on the party-generated randomized mask, the decrypting performed such that the party is prevented from observing outputs of other parties.

2. The method of claim 1, wherein decrypting the output comprises:
   collecting a threshold number of key shares submitted to the block associated with the given temporal segment;
   deriving a blockchain decryption key based on the collected threshold number of key shares;
   decrypting the block of the blockchain associated with the given temporal segment based on the blockchain decryption key; and
   deriving the vector of output values masked by a plurality of party-generated randomized masks, including the party-generated randomized mask specific to the party, using an NIMPC decryption process.

3. The method of claim 2, wherein deriving the blockchain decryption key is further based on a public key and a verification key associated with the blockchain.

4. The method of claim 3, further comprising verifying, prior to deriving the blockchain decryption key, integrity of the threshold number of key shares based on the public key and the verification key associated with the blockchain.

5. The method of claim 1, wherein the first trusted authority and the second trusted authority are the same entity.

6. The method of claim 1, wherein the block of the given temporal segment is unavailable for decryption until a designated point in time selected when encrypting the NIMPC-encrypted input.

7. The method of claim 1, wherein the block of the given temporal segment is associated with energy trading for a specific segment of time.

8. The method of claim 1, wherein the correlated randomness component is correlated with other correlated randomness components of other parties such that computations may be performed on a set of inputs from a set of parties protected by respective correlated randomness components without observing values of the set of inputs.

9. One or more non-transitory computer-readable media containing instructions that, in response to being executed by one or more processors, cause a system to perform operations comprising:
   receiving, from a first trusted authority, a secret key specific to a party for use in posting to a block chain;
   receiving, from a second trusted authority, a correlated randomness component specific to the party and associated with a given temporal segment;
   generating a party-generated randomized mask;
   computing, by an electronic device of the party, using an input from the party, the correlated randomness component, and the party-generated randomized mask in a non-interactive multi-party computation (NIMPC), an NIMPC-encrypted input associated with the party for the given temporal segment;
   encrypting, by the electronic device of the party, the NIMPC-encrypted input according to a blockchain encryption algorithm to yield a ciphertext;
   submitting the ciphertext to a block associated with the given temporal segment in a blockchain; and
   decrypting an output from the block of the blockchain associated with the given temporal segment, including unmasking an output value of the party from a vector of output values based on the party-generated randomized mask, the decrypting performed such that the party is prevented from observing outputs of other parties.

10. The computer-readable media of claim 9, wherein decrypting the output comprises:
    collecting a threshold number of key shares submitted to the block associated with the given temporal segment;
    deriving a blockchain decryption key based on the collected threshold number of key shares;
    decrypting the block of the blockchain associated with the given temporal segment based on the blockchain decryption key; and
    deriving the vector of output values masked by a plurality of party-generated randomized masks, including the party-generated randomized mask specific to the party, using an NIMPC decryption process.

11. The computer-readable media of claim 10, wherein deriving the blockchain decryption key is further based on a public key and a verification key associated with the blockchain.

12. The computer-readable media of claim 11, wherein the operations further comprise verifying, prior to deriving the blockchain decryption key, integrity of the threshold number of key shares based on the public key and the verification key associated with the blockchain.

13. The computer-readable media of claim 9, wherein the first trusted authority and the second trusted authority are the same entity.

14. The computer-readable media of claim 9, wherein the block of the given temporal segment is unavailable for decryption until a designated point in time selected when encrypting the NIMPC-encrypted input.

15. The computer-readable media of claim 9, wherein the block of the given temporal segment is associated with energy trading for a specific segment of time.

16. The computer-readable media of claim 9, wherein the correlated randomness component is correlated with other correlated randomness components of other parties such that computations may be performed on a set of inputs from a set of parties protected by respective correlated randomness components without observing values of the set of inputs.

17. A system comprising:
one or more processors; and
one or more non-transitory computer-readable media containing instructions that, in response to being executed by one or more processors, cause the system to perform operations comprising:
receiving, from a first trusted authority, a secret key specific to a party for use in posting to a block chain;
receiving, from a second trusted authority, a correlated randomness component specific to the party and associated with a given temporal segment;
generating a randomized mask specific to the party;
computing, by the system, using an input from the party, the correlated randomness component, and the randomized mask in a non-interactive multi-party computation (NIMPC), an NIMPC-encrypted input associated with the party for the given temporal segment;
encrypting, by the system, the NIMPC-encrypted input according to a blockchain encryption algorithm to yield a ciphertext;
submitting the ciphertext to a block associated with the given temporal segment in a blockchain; and
decrypting an output from the block of the blockchain associated with the given temporal segment, including unmasking an output value of the party from a vector of output values based on the party-generated randomized mask, the decrypting performed such that the party is prevented from observing outputs of other parties;
the system operated by the party.

18. The system of claim 17, wherein decrypting the output comprises:
collecting a threshold number of key shares submitted to the block associated with the given temporal segment;
deriving a blockchain decryption key based on the collected threshold number of key shares;
decrypting the block of the blockchain associated with the given temporal segment based on the blockchain decryption key; and
deriving the vector of output values masked by a plurality of party-generated randomized masks, including the party-generated randomized mask specific to the party, using an NIMPC decryption process.

* * * * *